United States Patent Office 2,955,837
Patented Oct. 11, 1960

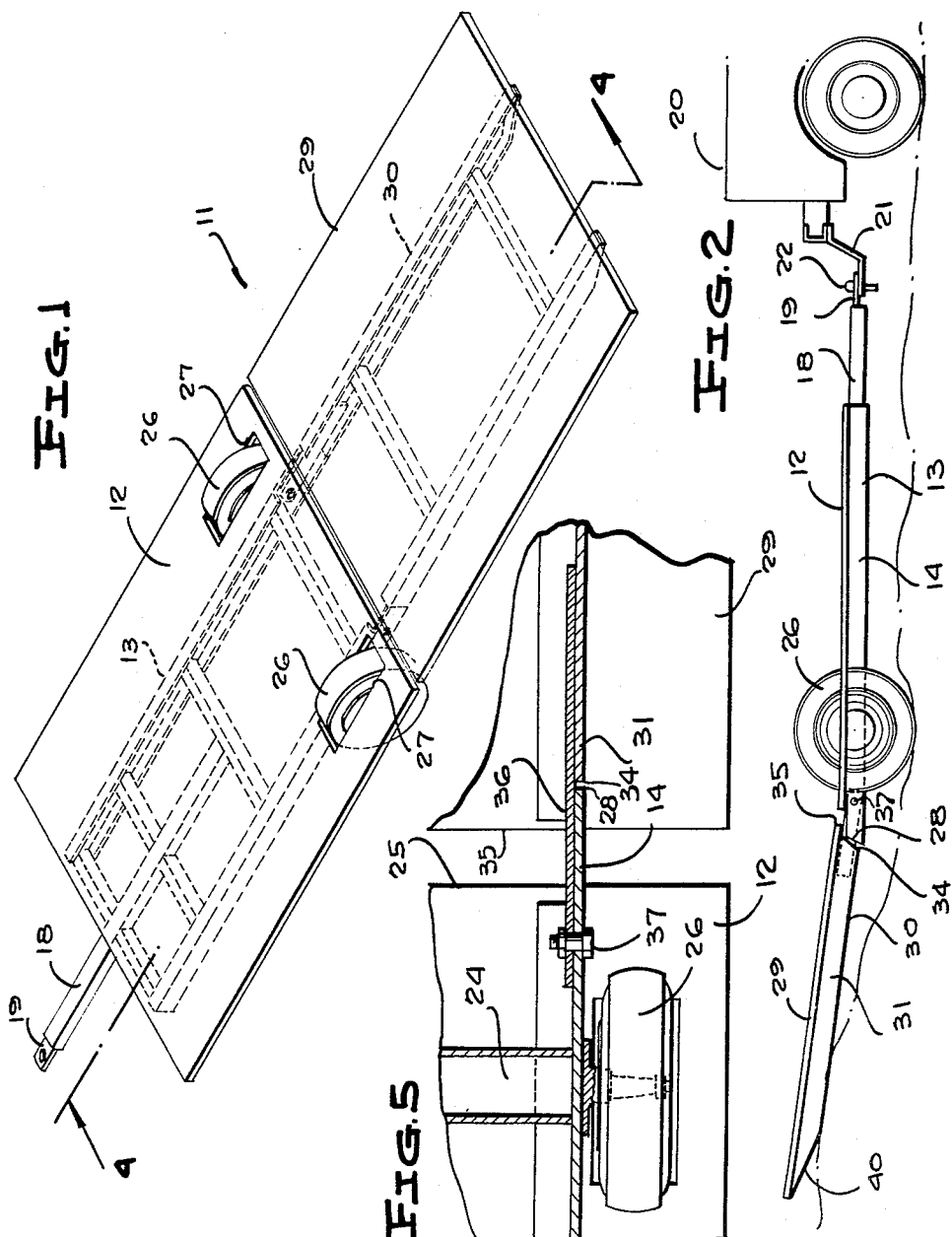

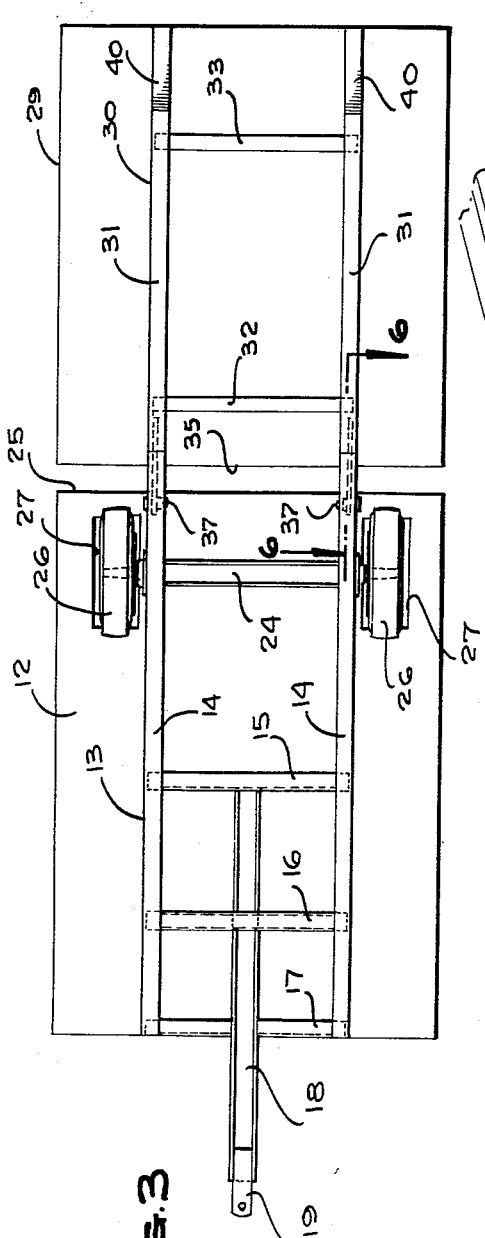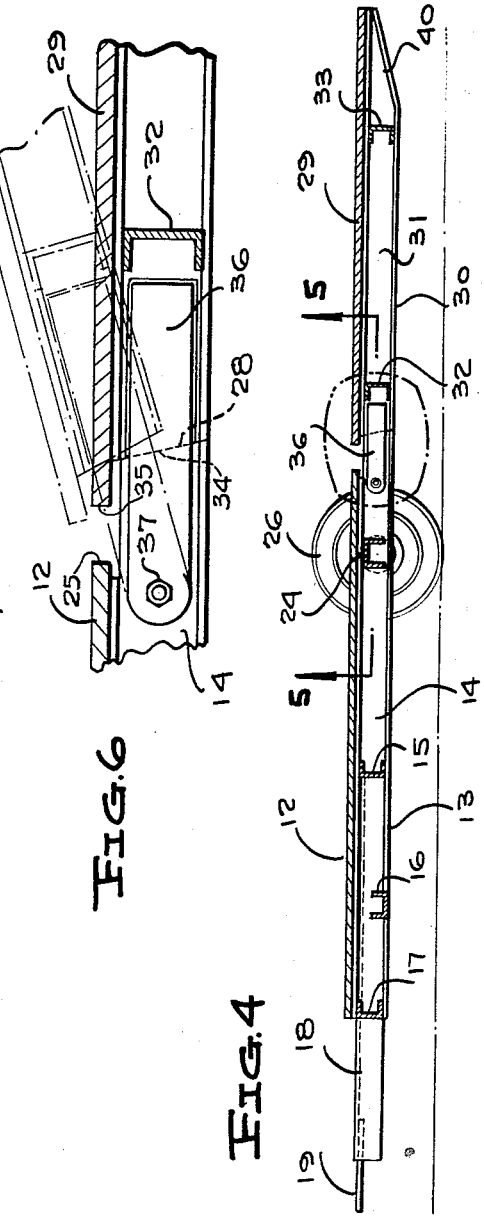

2,955,837
TRAILER CONSTRUCTION
William W. Bachtell, Wadena, Iowa
Filed Oct. 23, 1959, Ser. No. 848,259
2 Claims. (Cl. 280—63)

This invention relates to trailer vehicles, and more particularly to a two-wheeled trailer of the articulated or hinged type.

The main object of the invention is to provide a novel and improved trailer vehicle of the type having a relatively low bed and which is hinged or articulated so that it is relatively flexible and will readily modify itself in accordance with rough or uneven terrain over which it is moved, the trailer being simple in construction, being adapted for use to carry a wide variety of loads, and being adapted to be hauled by any conventional vehicle such as a farm tractor, or the like.

A further object of the invention is to provide an improved hinged or articulated trailer which is relatively inexpensive to fabricate, which is durable in construction, and which is useful for a wide variety of purposes, such as for transporting farm products, machinery, lumber, or other materials of a bulky or massive nature.

Further objects and advantages of the invention will become apparent from the following description and claims, and from the accompanying drawings, wherein:

Figure 1 is a perspective view of an improved articulated trailer constructed in accordance with the present invention.

Figure 2 is a side elevational view of the trailer of Figure 1, shown connected to a motor vehicle.

Figure 3 is a bottom plan view of the trailer illustrated in Figures 1 and 2.

Figure 4 is a longitudinal vertical cross sectional view taken on the line 4—4 of Figure 1.

Figure 5 is an enlarged horizontal cross sectional view taken on the line 5—5 of Figure 4.

Figure 6 is an enlarged vertical cross sectional view taken substantially on the line 6—6 of Figure 3.

Referring to the drawings, 11 generally designates a trailer constructed in accordance with the present invention. The trailer 11 comprises a generally rectangular main bed member 12 which is secured on a horizontal under frame 13, said under frame comprising the respective longitudinally extending side bars 14, 14 which are connected by the horizontal transverse cross bars 15, 16 and 17. Integrally united with the frame and extending longitudinally thereof midway between the side bars 14, 14 is a drawbar member 18 which projects forwardly from beneath the front margin of the bed 12 and which is provided at its end with the apertured hitch tongue 19, whereby it may be connected to the rear end of a suitable vehicle, such as a motor vehicle 20 in the manner illustrated in Figure 2. Thus, the motor vehicle may be provided with a conventional, rearwardly extending apertured hitch member 21 which may be coupled to the hit tongue 19 by means of a suitable coupling pin 22.

Secured to the bottom of bed 12 is a conventional, transversely extending axle assembly 24 which is located adjacent the rear transverse edge 25 of bed 12. Journaled on the ends of the axle 24, outwardly adjacent the longitudinal side bars 14, 14 are the respective supporting wheels 26, 26, said wheels projecting through longitudinal slots 27, 27 provided therefor in the rear marginal portion of the bed 12.

The longitudinal side bars 14, 14 extend a substantial distance rearwardly beyond the transverse rear edge 25 of bed 12 and are formed at their ends with the downwardly and rearwardly inclined edges 28.

Designated generally at 29 is an auxiliary bed member of generally rectangular shape, and of substantially the same width as the main bed member 12. The auxiliary bed member 29 is of substantial length and is secured on an under frame 30 comprising the longitudinal side bars 31, 31 which are rigidly connected by the transversely extending cross bars 32 and 33, as is clearly shown in Figure 3. The side bars 31, 31 are spaced apart by the same distance as the side bars 14, 14 of the under frame 13 associated with the main bed 12, whereby the side bars 31, 31 may be placed in longitudinal alignment with the side bars 14, 14 of said main bed. The side bars 31, 31 are formed with the downwardly and rearwardly inclined front edges 34 which are adapted to supportingly engage on the downwardly inclined rear end edges 28 of the side bars 14, in a manner presently to be described.

As shown in Figure 2, the inclined front edges 34 of the side bars 31 are spaced inwardly from the transverse front edge 35 of the auxiliary bed member 29, whereby the rear ends of the side bars 14, 14 of the main bed member are receivable beneath the front marginal portion of the auxiliary bed member 29. Rigidly secured to the inside surfaces of the side bars 31, 31 are the vertical, longitudinally extending hinge bars 36, 36 which project forwardly a substantial distance from the transverse front edge 35 of the auxiliary bed 29 and which are receivable beneath the rear transverse marginal portion of the main bed 12. The front end portions of the hinge bars 36 are pivotally connected to the side bars 14, 14 by transverse hinge bolts 37, 37, said hinge bolts being spaced inwardly a substantial distance from the transverse rear edge 25 of main bed 12, as is clearly shown in Figure 5. The hinge bolts 37, 37 are transversely aligned and thus define a hinge axis spaced forwardly from the transverse margin 25 of the main bed 12 and spaced forwardly a larger distance from the rear ends of the side bars 14, 14.

As will be readily apparent, the forward marginal portion of the auxiliary bed member 29 is supportingly receivable on the top edges of the rearwardly extending portions of side bars 14, 14, and the inclined edges 34 of the side bars 31 of the auxiliary bed member are likewise supportingly receivable on the inclined rear end edges 28 of side bars 14. Thus, when the trailer is in its normal position, for example, on a smooth roadway, the auxiliary bed member 29 will be supported substantially in horizontal alignment with the main bed member 12. However, when the trailer is pulled over uneven or irregular terrain, for example, the type of terrain illustrated in Figure 2, the auxiliary bed member is free to hinge upwardly relative to the main bed member 12 and may change its configuration as its rear portion engages the roadway or other terrain over which the trailer is traveling.

To facilitate the smooth movement of the hinged rear portion of the trailer, the side bars 31, 31 are beveled at their rear bottom corners, as shown at 40, namely, are sloped upwardly and rearwardly to define inclined ground-engaging surfaces to enable the rear end portions of side bars 31, 31 to smoothly engage the ground. The low height of the trailer bed members makes the trailer device particularly useful in handling farm products, such as bales of hay, or other bulky objects, including farm machinery, allowing such objects to be loaded from the ground with minimum effort.

While a specific embodiment of an improved articulated trailer construction has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A trailer of the character described comprising a main bed member having a hitch tongue at its forward end and provided with a pair of supporting wheels journaled thereto on a transverse axis adjacent its rear end, said main bed member including a horizontal subframe having respective longitudinally extending side bar members, an auxiliary bed member of substantial length disposed rearwardly adjacent said main bed member and overlying the rear ends of said side bar members, and means hingedly connecting the auxiliary bed member to the side bar members for upward swinging movement thereon on a transverse horizontal axis spaced forwardly from the rear ends of the side bar members, said auxiliary bed member including a subframe having longitudinal side bar members aligned with said first-named side bar members and having upwardly and forwardly inclined end edges supportingly engageable against the ends of said first-named side bar members.

2. A trailer of the character described comprising a main bed member having a hitch tongue at its forward end and provided with a pair of supporting wheels journaled thereto on a transverse axis adjacent its rear end, said main bed member including a horizontal subframe having respective longitudinally extending side bars, an auxiliary bed member of substantial length disposed rearwardly adjacent said main bed member and overlying the rear ends of said side bar members, and means hingedly connecting the auxiliary bed member to the side bar members of said main bed member for upward swinging movement around a transverse horizontal axis spaced forwardly from the rear ends of the side bar members of the main bed member, the rear end edges of the first-named side bar members being inclined downwardly and rearwardly and said auxiliary bed member including a subframe having longitudinal side bar members aligned with said first-named side bar members and having inclined end edges corresponding to and supportingly engageable against the inclined end edges of said first-named side bar members.

References Cited in the file of this patent

UNITED STATES PATENTS

| | | |
|---|---|---|
| 1,062,887 | Carr | May 27, 1913 |
| 2,569,965 | Wiedman | Oct. 2, 1951 |